2,902,431
HYDROCRACKING OF ASPHALT-CONTAINING MATERIALS

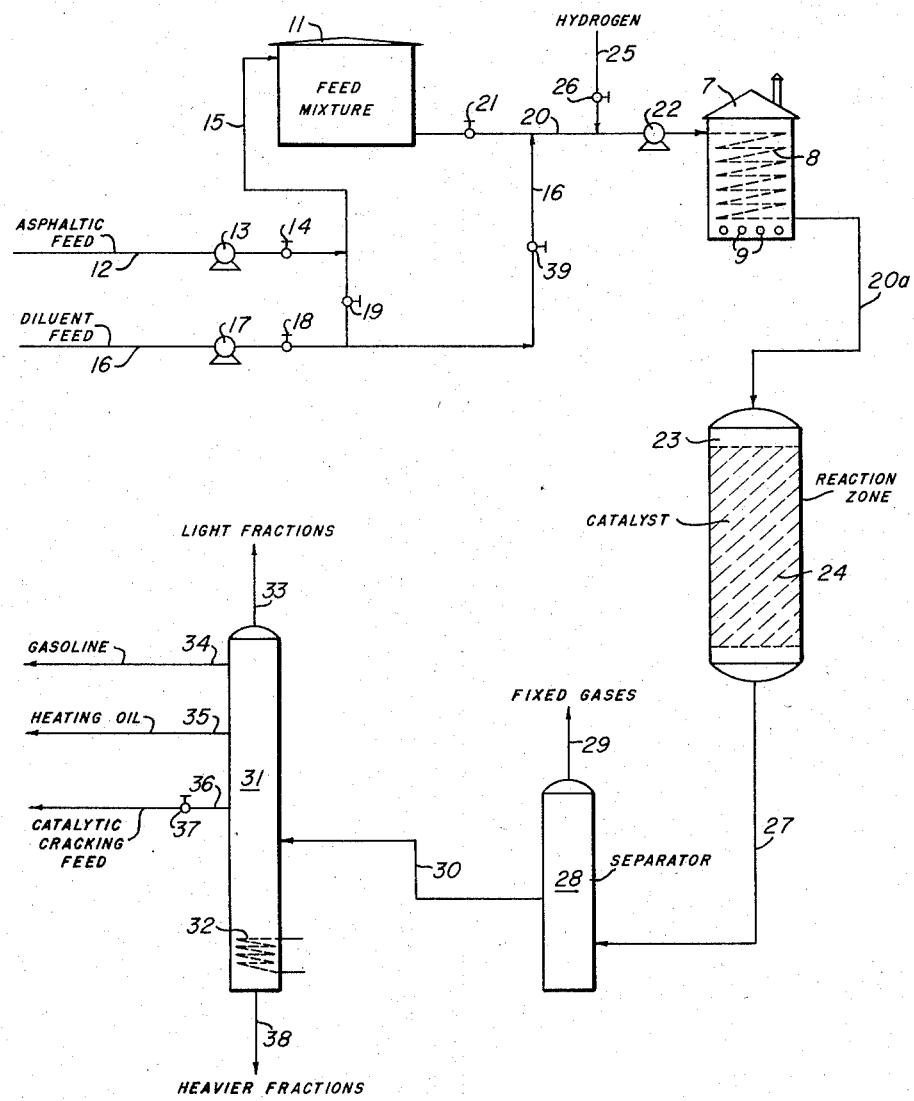
INVENTORS.
James A. Dinwiddie,
Max A. Mosesman,
Charles L. Thorpe,
BY
ATTORNEY

United States Patent Office

James A. Dinwiddie, Max A. Mosesman, and Charles L. Thorpe, Baytown, Tex., assignors, by mesne assignments, to Esso Research and Engineering Company, Elizabeth, N.J., a corporation of Delaware Application February 28, 1955, Serial No. 490,864

5 Claims. (Cl. 208—110)

The present invention is directed to an improved process for producing valuable products from asphalt-containing materials. It particularly relates to an improved method for hydrocracking asphaltic substances employing a silica base catalyst comprising an oxygen-containing compound of molybdenum.

Briefly, the process of the present invention may be described as contacting an asphaltic-containing substance, such as an asphalt, a diluted asphalt, a residuum derived from a petroleum crude oil and the like with a hydrocracking catalyst having a predominantly silica base in the presence of added hydrogen or a hydrogen-containing gas whereby substantial portions of the asphalt are converted to lower boiling useful materials. The catalyst base preferably contains at least about 90% by weight of silica in the form of silica gel, silica derived from natural clays and the like. The catalyst also preferably contains an oxygen-containing compound of molybdenum such as molybdenum oxide, cobalt molybdate and the like.

The asphaltic material may be derived from a variety of sources such as crude petroleum oils, hydrogenated coals, bitumens, coal tar fractions and other sources of natural and synthetic origin, and will have characteristics well known to those skilled in the art. For example, it may be obtained by deasphalting a residue resulting from the distillation of crude petroleums such as the residual fractions obtained by distillation of Panhandle crude and the like. The invention has particular application to conversion of asphaltic materials derived from crude petroleum oils. Although an essentially asphaltic material may be used in the practice of the present invention, it is preferred that it be diluted with a suitable lower boiling diluent. For example, a crude oil residue such as one representing the lower 10 to 25% fraction of the crude oil, and comprising hydrocarbons boiling in the gas oil and/or lubricating oil boiling range may be used. In other cases, it may be desired to blend an essentially asphaltic material with a suitable diluent such as a gas oil or lower boiling hydrocarbon boiling in the range of about 200° to 1000° F., but preferably boiling from about 430° to 650° F. Such diluted asphalts are preferred because they are more easily handled than the viscous semi-solid asphalts themselves and also since they have less tendency to contaminate catalytic materials during the hydrocracking operation.

In a suitable form of the invention, the asphaltic material is passed through a fixed bed of granular catalyst in the presence of a hydrogen-containing gas at elevated temperatures and pressures. Temperatures may suitably range from about 700° to 1000° F., but preferably range from about 750° to 800° F. Relatively low pressures may be used in contrast to conventional asphalt hydrogenation processes, those in the range of about 100 to 1000 p.s.i.g., preferably from about 300 to 600 p.s.i.g. are useful.

Space velocities in the reaction zone may range from about 0.1 to 5 volumes of feed per volume of catalyst per hour (v./v./hr.) with those in the range from 0.25 to 2 v./v./hr. being especially useful. The hydrogen may be any suitable hydrogen-containing material which may be employed in an amount in the range from about 500 to 6000 cubic feet of hydrogen per barrel of feed mixture, a preferred amount being in the range of 500 to 2000 cubic feet per barrel.

The catalyst employed in the practice of the present invention is a suitable silica base hydrocracking catalyst containing an activating amount of an active metal containing hydrocracking agent, such as an oxygen compound of molybdenum, preferably along with other active ingredients such as cobaltia, complexes of cobalt and molybdenum oxides, nickel oxide and the like. The siliceous base should contain less than about 10 weight percent, preferably less than 5 weight percent, of other supporting materials such as alumina, magnesia and other adsorptive type supporting materials. Preferably substantially pure silica such as silica gel is used as a supporting material. The amount of catalytic agent such as molybdena, mixtures of molybdena and cobaltia, cobalt molybdate, nickel oxide, iron oxide, and the like may range from about 1 to 25 weight percent based on the total catalyst mixture, but preferably will comprise about 5 to 20 weight percent of such activating agents. The activating material may be impregnated on the silica base by a number of procedures, such as by wet mulling the base and the oxide or a suitable metal salt that will be converted to the oxide during heating. The wet mulled mixture may then be dried, heated or calcined at elevated temperatures and pilled into the form of catalyst granules.

The catalyst, prior to contact with the feed, may suitably be contacted at an elevated temperature with a portion of sulfur containing diluent oil.

The present invention may be further illustrated by reference to the drawing in which the single figure is a flow diagram of a preferred mode.

Referring now to the drawing, numeral 11 designates a tank in which a feed mixture of asphaltic material may be accumulated. The feed mixture may be formed, for example, by introducing an asphaltic hydrocarbon, which may be a crude residue, by way of line 12 containing pump 13 and controlled by valve 14 into tank 11 by way of line 15 in admixture with a diluent hydrocarbon from a source not shown which is introduced into the system by way of line 16 containing pump 17; line 16 is controlled by valve 18. Line 16 connects into line 15 which, in turn, is controlled by valve 19.

The feed mixture in tank 12 is withdrawn therefrom by line 20 controlled by valve 21 and is pumped by pump 22 into a reaction zone 23 which suitably contains a bed 24 of a catalyst of the nature described which, for purposes of this description, may be cobalt molybdate on silica gel. On passing through line 20 there is added to the feed mixture by way of line 25 controlled by valve 26 a sufficient amount of hydrogen in the range given to allow the reaction to proceed as is desired. The feed mixture including hydrogen added by line 25 is heated to reaction temperatures by passage through a furnace 7 containing a heating coil 8 which is supplied with heat from burners 9. The heated mixture discharges from coil 8 by line 20a into reaction zone 23.

On passage of the mixture of hydrogen and feed through the reaction zone 24, the asphaltic hydrocarbons are substantially converted in a hydrocracking reaction to hydrocarbons of lower boiling range; such hydrocarbons produced in the process may include naphtha, heating oil and heavier hydrocarbons. Some desulfurization of the asphalt may take place. The converted product discharges from reaction zone 23 by line 27 which leads into a separation zone 28 wherein a separation is made between the fixed gases containing unconsumed hydrogen and the converted product. The hydrogen and other fixed gases are withdrawn from zone 28 by line 29 and may be recycled to line 25 while the converted products issue from zone 28 by line 30 and discharge thereby into a distillation zone 31 which may be a single distillation tower or a plurality of fractional distillation towers. Distillation zone 31, while shown diagrammatically in the drawing, is intended to include all auxiliary equipment usually associated with the modern distillation tower. For example, the zone 31 will include cooling and condensing means, means for inducing reflux and internal vapor-liquid contact means, such as bell cap trays, packing and the like. Zone 31 is also provided with a heating means illustrated by a steam coil or equivalent heating means 32 for adjustments of temperature and pressure. Zone 31 is also provided with line 33 for removal of fractions lighter than gasoline, line 34 for removal of gasoline and naphtha hydrocarbons, line 35 for withdrawal of heating oil fractions and line 36 controlled by valve 37 for withdrawal of catalytic cracking feed. Zone 31 is also provided with line 38 for discharging of heavier fractions.

Zone 31 may be operated in any number of different ways. For example, all of the light fractions may be taken off as one fraction including heating oil, gasoline and lighter materials, leaving the catalytic cracking feed and the heavier fractions to be withdrawn by line 38 with valve 37 being closed. If desired, the lighter components of the diluent fraction may be withdrawn by line 36 and the heavier fraction withdrawn by line 38 subjected to suitable deasphalting and other treatments to recover cracking stock and the diluent. Either of the several fractions may be recycled to line 16, such as the fractions withdrawn by lines 35, 36 and 38 as desired.

It is desirable in the practice of the present invention to charge the feed mixture to the reaction zone 23 until the conversion to desirable products tends to decrease. When such happens, valve 21 may be closed and valves 14 and 19 also closed allowing the diluent hydrocarbon to be routed by line 16 directly into line 20 and thence into the zone 23 over the catalyst bed 24 in admixture with hydrogen introduced by line 25 as desired. This operation allows the catalyst to be regenerated. The diluent feed is continued over the catalyst for a period of time ranging from 8 to 48 hours and thereafter the valve 19 is opened and valve 39 in line 16 is closed allowing the feed mixture on opening valve 21 in line 20 to be routed again to reaction zone 23. Of course, valve 14 in line 12 may be opened allowing the makeup of feed mixture in tank 11.

The present invention results in the production of useful products, such as naphthas, gasolines, heating oils and gas oils from asphaltic materials. The invention is dependent on a number of operating variables. For example, pressure is important since at low pressures, for example, below 100 pounds per square inch gauge operating temperature must be kept low and the overall reaction rate tends to fall off. The amount of diluent volatilized from the catalyst increases and with sufficient volatilization of the diluent coking of the catalyst takes place. Operating at higher pressures, but below 1000 pounds per square inch gauge allows the overall reaction toward desirable products to be increased since operating temperatures in the range given may be increased. In general, higher temperature results in increasing the ratio of gasoline to gas oil in the product. If pressures above 1000 pounds per square inch gauge are employed, gas production increases and hydrogen consumption increases which tends to make the process undesirable.

During the course of operation the catalyst will tend to lose its ability to convert the asphaltic material to desirable hydrocarbons. It may suitably be regenerated by cutting out the asphaltic component of the feed mixture and charging only the diluent to the catalyst bed in the presence of hydrogen at reaction conditions. The period of charging the diluents in the absence of asphalt may range from about 8 to 48 hours, sufficient to recondition the catalyst for conversion of asphalts to desirable hydrocarbons. After repeated reconditioning of the catalyst with diluent hydrocarbon it may become necessary to subject the catalyst to more severe regenerating conditions such as, for example, treatment with an oxygen-containing gas to burn off coke-like deposits which were not removed by conditioning the catalyst with diluent hydrocarbon. The conventional procedures for oxidative regeneration may be used which will include the steps of displacing hydrocarbon from the catalyst zone such as by purging with an inert gas followed by controlled addition of oxygen-containing gas to the zone either alone or in admixture with inert gas such as flue gas.

The invention will now to be described in more detail in connection with the following example:

EXAMPLE

A series of hydrocracking operations were carried out employing the following catalysts:

*Catalyst 1.*—This catalyst was a conventional alumina base catalyst promoted with cobaltia and molybdena. The base contained about 94 weight percent alumina and 6 weight percent silica, and the final catalyst composition was about 3 weight percent CoO, 9% $MoO_3$, 5% $SiO_2$ and 83% $Al_2O_3$. The catalyst was pilled in the form of ⅛″ x ⅛″ pills and heat treated for four hours at about 1100° F. before use.

*Catalyst 2.*—A conventional gel-type silica-alumina catalyst containing about 13 weight percent alumina and 87 weight percent silica was wet mulled with cobaltous acetate and $MoO_3$ using amounts sufficient to form a finished catalyst mixture containing 15 weight percent cobalt molybdate. The mixture was dried, heated slowly to 800° F. and maintained at that temperature for 2 hours. It was then pilled to form ⅛″ pills and heated for 24 hours at 1100° F.

*Catalyst 3.*—This catalyst was formed in the same manner as catalyst 2 except that commercial Celite containing about 93% silica, 4% alumina and small amounts of lime, magnesia and iron oxide, was used as a base.

*Catalyst 4.*—This catalyst was formed in the same manner as catalyst 2 except that silica hydrogel was used as a base material. The silica hydrogel was converted to silica gel during the drying and heating operations.

The common feed stock employed in all of the hydrocracking runs was a blend of 60 weight percent Coastal light gas oil and 40 weight percent asphalt obtained by conventional solvent deasphalting of mixed residua obtained from crude petroleum oils. The Coastal gas oil had a gravity of 31.7 °API, a 5 to 95% ASTM boiling range of from 460° to 596° F., and contained 0.1 weight percent sulfur. The asphalt had a Furol viscosity at 325° F. of 915, a softening point of 205° F., and a specifiic gravity of 60/60° F. of 1.0752. The gas oil-asphalt blend contained 1.76 weight percent sulfur and had an API gravity of 19.5.

All of the runs were carried out in a fixed bed reaction zone using a liquid space velocity of 0.5 v./v./ hr., a reactor pressure of 400 p.s.i.g. and a hydrogen feed rate of 1000 cubic feet per barrel. In runs carried out with a given catalyst, the reactor was operated for 16 hours at a temperature of 750° F., the reaction temperature was increased to 775° F. and operated for another 16 hours, and then the reactor temperature was increased to 800° F. for another 16-hour period. The total products from each 16 hour period were withdrawn and evaluated for API gravity and sulfur content. The increase in gravity of the product over the charge stock is a measure of the extent to which hydrocracking of the asphalt takes place.

The results of these runs are shown in the table:

Table

| Catalyst Employed | | 1 | | | 2 | | | 3 | | | 4 | | |
|---|---|---|---|---|---|---|---|---|---|---|---|---|---|
| Silica in Catalyst Base, Wt. Percent | | 6 | | | 87 | | | ¹93 | | | 100 | | |
| Alumina in Catalyst Base, Wt. Percent | | 94 | | | 13 | | | ¹4 | | | 0 | | |
| Reaction Temperature, °F | | 750 | 775 | 800 | 750 | 775 | 800 | 750 | 775 | 800 | 750 | 775 | 800 |
| Inspections on Products: | Charge Stock | | | | | | | | | | | | |
| Gravity, °API | 19.5 | 22.6 | 23.6 | 23.8 | 22.7 | 22.5 | 23.8 | 21.2 | 23.2 | 25.4 | 22.8 | 24.0 | 25.0 |
| Sulfur, Wt. Percent | 1.76 | 0.92 | 0.91 | 0.95 | 1.37 | 1.31 | 1.31 | 1.47 | 1.23 | 1.18 | 1.22 | 1.08 | 1.09 |
| Increase in Gravity of Product over charge, °API | | 3.1 | 4.1 | 4.3 | 3.2 | 3.0 | 4.3 | 1.7 | 3.7 | 5.9 | 3.3 | 4.5 | 5.5 |

¹ Remainder of catalyst base comprises lime, magnesia, iron oxide, etc.

At temperatures of 775° F. and higher, the silica gel base catalyst No. 4 was definitely superior to any of the other catalysts with respect to hydrocracking. At a temperature of 800° F., both catalysts Nos. 3 and 4 were definitely superior to either of the catalysts containing larger amounts of alumina in the support, the the essentially silica base catalysts showing a gravity increase of about 5.5 to 5.9 °API in contrast to a gravity increase of about 4.3 for the bases containing 6 to 87% silica.

At all temperatures the alumina base catalyst No. 1 was superior to the other catalysts with respect to desulfurization. However, catalyst No. 4 gave substantial desulfurization at temperatures of from 775 to 800° F.

What is claimed is:

1. A process for the hydrocracking of an asphaltic material comprising asphaltic hydrocarbons and lower boiling normally liquid hydrocarbons wherein said asphalt is contacted in a conversion zone with a fixed bed of catalyst in the presence of added hydrogen at a pressure within the range of about 300 to 600 p.s.i.g. and at a temperature in the range of about 775° to 850° F., said catalyst consisting of about 10% to 20% by weight of cobalt molybdate supported on from about 90 to about 80 weight per cent of silica gel.

2. A process for the hydrocracking of an asphaltic hydrocarbon feed stock wherein said feed stock is contacted in a conversion zone with a fixed bed of catalyst under conversion conditions including a temperature in the range of about 775° to 850° F., a pressure of about 100 to 1000 p.s.i.g., a space velocity of about 0.1 to 5 v./v./hr. in the presence of about 500 to 6000 cubic feet of hydrogen per barrel of feed stock, said catalyst consisting essentially of from about 10% to about 20% by weight of oxides of cobalt and molybdenum deposited on from about 90% to about 80% by weight of a carrier consisting of at least 90 weight percent of silica.

3. A process as in claim 2 wherein the catalyst consists essentially of about 15 weight percent of cobalt molybdate deposited on about 85% by weight of a carrier consisting of about 90 weight percent silica.

4. A process for the hydrocracking of an asphaltic hydrocarbon feed stock wherein said feed stock is contacted in a conversion zone with a fixed bed of catalyst under conversion conditions including a temperature of about 775° to 850° F., a pressure of about 300 to 600 p.s.i.g., and a space velocity of about 0.5 to 2 v./v./hr., in the presence of about 500 to 2000 cubic feet of hydrogen per barrel of feed stock, said catalyst consisting essentially of from about 10 to about 20 weight percent of oxides of cobalt and molybdenum deposited on from about 90 to about 80 weight percent of a silica-alumina carrier consisting of about 90 to 100 weight percent of silica and from about 10 to 0 percent of alumina.

5. A process as in claim 4 wherein the catalyst consists essentially of about 15 weight percent of cobalt molybdate deposited on about 85 weight percent of a carrier consisting of silica.

References Cited in the file of this patent

UNITED STATES PATENTS

| 2,662,846 | Montgomery et al. | Dec. 15, 1953 |
| 2,687,381 | Hendricks | Aug. 24, 1954 |
| 2,700,014 | Anhorn et al. | Jan. 18, 1955 |
| 2,703,308 | Oblad et al. | Mar. 1, 1955 |
| 2,768,936 | Anderson et al. | Oct. 30, 1956 |
| 2,772,212 | Seyfried | Nov. 17, 1956 |